United States Patent
Higashino et al.

(10) Patent No.: US 10,424,801 B2
(45) Date of Patent: Sep. 24, 2019

(54) CELL STRUCTURE, METHOD FOR MANUFACTURING THE SAME, AND FUEL CELL

(71) Applicant: SUMITOMO ELECTRIC INDUSTRIES, LTD., Osaka-shi, Osaka (JP)

(72) Inventors: Takahiro Higashino, Itami (JP); Yohei Noda, Itami (JP); Chihiro Hiraiwa, Itami (JP); Naho Mizuhara, Itami (JP); Hiromasa Tawarayama, Itami (JP); Hisao Takeuchi, Itami (JP); Masatoshi Majima, Itami (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 261 days.

(21) Appl. No.: 15/525,104

(22) PCT Filed: Oct. 20, 2015

(86) PCT No.: PCT/JP2015/079495
§ 371 (c)(1),
(2) Date: May 8, 2017

(87) PCT Pub. No.: WO2016/076078
PCT Pub. Date: May 19, 2016

(65) Prior Publication Data
US 2017/0317371 A1 Nov. 2, 2017

(30) Foreign Application Priority Data
Nov. 13, 2014 (JP) .................. 2014-230625

(51) Int. Cl.
*H01M 8/12* (2016.01)
*H01M 8/1213* (2016.01)
*H01M 8/1253* (2016.01)
*H01M 8/126* (2016.01)
*H01M 8/02* (2016.01)
*H01M 4/90* (2006.01)
*H01M 8/04082* (2016.01)
*H01M 8/124* (2016.01)

(52) U.S. Cl.
CPC ....... *H01M 8/1253* (2013.01); *H01M 4/9033* (2013.01); *H01M 8/02* (2013.01); *H01M 8/04201* (2013.01); *H01M 8/12* (2013.01); *H01M 8/126* (2013.01); *H01M 8/1213* (2013.01); *H01M 2008/1293* (2013.01); *H01M 2300/0074* (2013.01); *Y02P 70/56* (2015.11)

(58) Field of Classification Search
CPC .. H01M 4/9033; H01M 8/02; H01M 8/04201; H01M 8/12; H01M 8/1213; H01M 8/1253; H01M 8/126; H01M 10/0561; H01M 2008/1293; H01M 2300/0074
See application file for complete search history.

(56) References Cited

U.S. PATENT DOCUMENTS 7,632,596 B2 * 12/2009 Al-Qattan ........... H01M 8/0258
429/481
2014/0147758 A1   5/2014 Akiyama et al.

FOREIGN PATENT DOCUMENTS

| CN | 103613105 A | 3/2014 |
|----|-------------|--------|
| JP | 2001-307546 A | 11/2001 |
| JP | 2012-119212 A | 6/2012 |
| WO | WO-2013/080415 A1 | 6/2013 |

OTHER PUBLICATIONS

Jing Qian et al., "Fabrication and performance of $BaCe_{0.8}Y_{0.2}O_{3-\delta}$-$BaZr_{0.8}Y_{0.2}O_{3-67}$ bilayer electrolyte for anode-supported solid oxide fuel cells", Journal of Power Sources, vol. 249, 2014, pp. 131-136.
Emiliana Fabbri, et al., "Design and fabrication of a chemically-stable proton conductor bilayer electrolyte for intermediate temperature solid oxide fuel cells (IT-SOFCs)", Energy and Environmental Science, vol. 1, No. 3, 2008, pp. 355-359.
Noboru Taniguchi et al., "Endurance against moisture for protonic conductors of perovskite-type ceramics and preparation of practical conductors," Solid State Ionics 145, 2001, pp. 349-355.

* cited by examiner

*Primary Examiner* — Anca Eoff
(74) *Attorney, Agent, or Firm* — Drinker Biddle & Reath LLP

(57) ABSTRACT

A cell structure includes a cathode, an anode, and a protonically conductive solid electrolyte layer between the cathode and the anode. The solid electrolyte layer contains a compound having a perovskite structure and containing zirconium, cerium, and a rare-earth element other than cerium. If the solid electrolyte layer has a thickness of T, the elemental ratio of zirconium to cerium at a position 0.25 T from a surface of the solid electrolyte layer opposite the cathode, $Zr_C/Ce_C$, and the elemental ratio of zirconium to cerium at a position 0.25 T from a surface of the solid electrolyte layer opposite the anode, $Zr_A/Ce_A$, satisfy $Zr_C/Ce_C > Zr_A/Ce_A$, and $Zr_C/Ce_C > 1$.

5 Claims, 2 Drawing Sheets

CELL STRUCTURE, METHOD FOR MANUFACTURING THE SAME, AND FUEL CELL

TECHNICAL FIELD

The present invention relates to cell structures including protonically conductive solid electrolytes and to fuel cells.

BACKGROUND ART

Fuel cells are devices that generate electricity by electrochemical reactions between fuels such as hydrogen and air (oxygen) and have high power generation efficiency since they can directly convert chemical energy into electricity. In particular, solid oxide fuel cells (hereinafter referred to as SOFCs), which have operating temperatures of 700° C. or higher, particularly about 800° C. to 1,000° C., have high reaction rates and are easy to handle since all cell elements are solid. The application of SOFCs, however, is limited to large power generation systems and household power generation because of their very high operating temperatures. With today's growing need for energy conservation, there is a need to extend the range of applications of SOFCs, which have high power generation efficiency, low noise, low emissions of environmentally harmful substances, and simple cell constructions.

SOFCs have high operating temperatures so that oxide ions can migrate through ceramic solid electrolytes. Accordingly, research has been directed to protonic ceramic fuel cells (PCFCs), which use hydrogen ions (protons), rather than oxide ions, as charge carriers since protons can migrate in the medium-temperature range (e.g., 400° C. to 600° C.). These fuel cells require protonically conductive solid electrolytes. Examples of known protonically conductive solid electrolytes include compounds having a perovskite structure, for example, metal oxides such as yttrium-doped barium zirconate (hereinafter referred to as BZY) and yttrium-doped barium cerate (hereinafter referred to as BCY) (PTL 1).

Metal oxides are susceptible to moisture. In particular, metal oxides containing cerium have been reported to be more susceptible to moisture than metal oxides containing zirconium (NPL 1).

CITATION LIST

Patent Literature

PTL 1: Japanese Unexamined Patent Application Publication No. 2001-307546

Non Patent Literature

NPL 1: Solid State Ionics, 145 (2001), 349-355

SUMMARY OF INVENTION

Technical Problem

Although a fuel cell including a solid electrolyte layer formed of BCY initially exhibits good power generation performance, it has low durability. This is probably because water produced at the cathode of the fuel cell during power generation reacts with BCY to decompose BCY and produce a reaction product in the interface between the cathode and the solid electrolyte layer.

On the other hand, although a fuel cell including a solid electrolyte layer formed of BZY has high durability, it exhibits low power generation performance. This is because BZY, despite being relatively stable to moisture, has low sinterability and thus contains numerous grain boundaries, which results in high resistance.

PTL 1 proposes a perovskite-type oxide containing zirconium and cerium (BZCY), which, however, has a higher resistance and thus a lower power generation performance than BCY.

Solution to Problem

One aspect of the present invention relates to a cell structure including a cathode, an anode, and a protonically conductive solid electrolyte layer between the cathode and the anode. The solid electrolyte layer contains a compound having a perovskite structure and containing zirconium, cerium, and a rare-earth element other than cerium. If the solid electrolyte layer has a thickness of T, the elemental ratio of zirconium to cerium at a position 0.25 T from a surface of the solid electrolyte layer opposite the cathode, $Zr_C/Ce_C$, and the elemental ratio of zirconium to cerium at a position 0.25 T from a surface of the solid electrolyte layer opposite the anode, $Zr_A/Ce_A$, satisfy $Zr_C/Ce_C > Zr_A/Ce_A$, and $Zr_C/Ce_C > 1$.

Another aspect of the present invention relates to a method for manufacturing a cell structure, including a first step of providing a cathode material, an anode material, and solid electrolytes, the solid electrolytes including a compound Z represented by formula (2): $A2Zr_{x1}Ce_{y1}B2_{1-x1-y1}O_{3-\delta}$ (where A2 is an alkaline earth metal element; B2 is a rare-earth element other than cerium; $x1/y1 > 1$; $0.4 \leq x1 \leq 1$; $0 \leq y1 \leq 0.5$; and $\delta$ is an oxygen deficiency) and a compound C represented by formula (3): $A3Zr_{x2}Ce_{y2}B3_{1-x2-y2}O_{3-\delta}$ (where A3 is an alkaline earth metal element; B3 is a rare-earth element other than cerium; $x1/y1 > x2/y2$; $0 \leq x2 < 0.5$; $0.4 \leq y2 \leq 1$; and $\delta$ is an oxygen deficiency); a second step of forming the anode material into an anode shape; a third step of depositing the compound C on a surface of the anode material; a fourth step of depositing the compound Z on a surface of the deposited compound C and sintering the compound Z to form a solid electrolyte layer; and a fifth step of depositing the cathode material on a surface of the solid electrolyte layer and sintering the cathode material.

Still another aspect of the present invention relates to a fuel cell including the above cell structure and having an oxidant channel for supplying an oxidant to the cathode and a fuel channel for supplying a fuel to the anode.

Advantageous Effects of Invention

According to the present invention, a cell structure can be provided that, when applied to a fuel cell, exhibits high power generation performance and durability.

DESCRIPTION OF EMBODIMENTS

Description of Embodiments

Figure 1A:
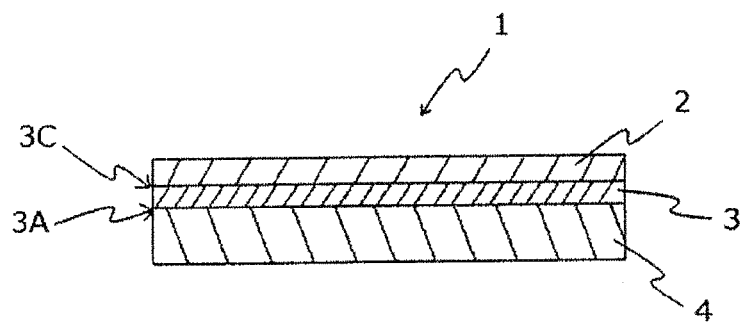
FIG. 1A is a schematic sectional view of a cell structure according to one embodiment of the present invention.

Embodiments of the present invention will first be described in sequence.

A cell structure according to a first aspect of the present invention includes (1) a cathode, an anode, and a protonically conductive solid electrolyte layer between the cathode and the anode. The solid electrolyte layer contains a compound having a perovskite structure and containing zirconium, cerium, and a rare-earth element other than cerium. If the solid electrolyte layer has a thickness of T, the elemental ratio of zirconium to cerium at a position 0.25 T from a surface of the solid electrolyte layer opposite the cathode, $Zr_C/Ce_C$, and the elemental ratio of zirconium to cerium at a position 0.25 T from a surface of the solid electrolyte layer opposite the anode, $Zr_A/Ce_A$, satisfy $Zr_C/Ce_C > Zr_A/Ce_A$, and $Zr_C/Ce_C > 1$. This cell structure, when applied to a fuel cell, exhibits high power generation efficiency and durability.

(2) Preferably, the elemental ratio $Zr_C/Ce_C \geq 2$, and the elemental ratio $Zr_A/Ce_A < 2$. This further improves the power generation efficiency and durability.

(3) Preferably, the compound is represented, as the average composition throughout the solid electrolyte, by formula (1): $A1Zr_xCe_yB1_{1-x-y}O_{3-\delta}$ (where A1 is an alkaline earth metal element; B1 is a rare-earth element other than cerium; $0.4 < x \leq 0.6$; $0 < y \leq 0.4$; and $\delta$ is an oxygen deficiency). This provides high protonic conductivity.

A method for manufacturing a cell structure according to a second aspect of the present invention includes (4) a first step of providing a cathode material, an anode material, and solid electrolytes, the solid electrolytes including a compound Z represented by formula (2): $A2Zr_{x1}Ce_{y1}B2_{1-x1-y1}O_{3-\delta}$ (where A2 is an alkaline earth metal element; B2 is a rare-earth element other than cerium; $x1/y1 > 1$; $0.4 \leq x1 \leq 1$; $0 \leq y1 \leq 0.5$; and $\delta$ is an oxygen deficiency) and a compound C represented by formula (3): $A3Zr_{x2}Ce_{y2}B3_{1-x2-y2}O_{3-\delta}$ (where A3 is an alkaline earth metal element; B3 is a rare-earth element other than cerium; $x1/y1 > x2/y2$; $0 \leq x2 < 0.5$; $0.4 \leq y2 \leq 1$; and $\delta$ is an oxygen deficiency); a second step of forming the anode material into an anode shape; a third step of depositing the compound C on a surface of the formed anode material; a fourth step of depositing the compound Z on a surface of the deposited compound C and sintering the compound Z to form a solid electrolyte layer; and a fifth step of depositing the cathode material on a surface of the solid electrolyte layer and sintering the cathode material. A cell structure manufactured by this method, when applied to a fuel cell or gas decomposition device, exhibits high power generation efficiency and durability.

A fuel cell according to a third aspect of the present invention includes (5) the above cell structure. The fuel cell has an oxidant channel for supplying an oxidant to the cathode and a fuel channel for supplying a fuel to the anode. This fuel cell exhibits high power generation efficiency and durability.

DETAILED DESCRIPTION OF EMBODIMENTS

Specific embodiments of the present invention will now be described. It should be understood, however, that the invention is not limited to the following embodiments; rather, the invention is defined by the claims, and all changes that come within the meaning and range of equivalency of the claims are intended to be embraced therein.

As shown in FIG. 1A, a cell structure 1 according to one embodiment includes, for example, a cathode 2, an anode 4, and a protonically conductive solid electrolyte layer 3 between the cathode 2 and the anode 4. The cathode 2, the solid electrolyte layer 3, and the anode 4 are combined together by sintering. Although FIG. 1A illustrates a multilayer cell structure, the cell structure is not limited to that shape. For example, the cell structure 1 may be rolled into a hollow cylinder with the anode 4 inside.

[Solid Electrolyte Layer]

At the cathode 2, protons migrating through the solid electrolyte layer 3 react with an oxidant to produce water. Therefore, it is desirable that a large amount of zirconium be present at least on the cathode side of the solid electrolyte layer 3 since zirconium has low reactivity with water. However, a fuel cell including a metal oxide containing a large amount of zirconium as a solid electrolyte has low power and thus low power generation performance. According to this embodiment, the elemental ratio of zirconium to cerium is varied on the cathode and anode sides of the solid electrolyte layer 3 to improve the power generation performance while improving the durability by reducing the reaction with water.

The cathode side of the solid electrolyte layer 3 refers to the side of the solid electrolyte layer 3 opposite the cathode 2, whereas the anode side of the solid electrolyte layer 3 refers to the side of the solid electrolyte layer 3 opposite the anode 4.

The solid electrolyte layer contains a compound having a perovskite structure ($ABO_3$). Zirconium (Zr) and cerium (Ce) are present in the B-sites of the compound. Some of the B-sites are substituted by a rare-earth element other than cerium. Such a dopant contributes to the protonic conductivity of the compound.

Examples of metal elements that may be present in the A-sites include, but not limited to, alkaline earth metals such as barium (Ba), calcium (Ca), and strontium (Sr). These may be used alone or in a combination of two or more. In particular, Ba is preferably present in the A-sites for reasons of protonic conductivity. In this case, the proportion of Ba that occupies the A-sites is preferably 50 atomic percent or more of the total amount of Ba and other elements.

Examples of rare-earth elements other than cerium (dopants) include yttrium (Y), scandium (Sc), neodymium (Nd), samarium (Sm), gadolinium (Gd), ytterbium (Yb), holmium (Ho), erbium (Er), and thulium (Tm). In particular, some of the B-sites are preferably occupied by Y for reasons of protonic conductivity. In this case, the proportion of Y among all dopants is preferably 50 atomic percent or more of the total amount of Y and other dopants.

Although the solid electrolyte layer may contain components other than the above compound, they are preferably present in limited amounts. For example, the above compound preferably accounts for 99% by mass or more of the solid electrolyte layer. Examples of components other than the above compound include, but not limited to, compounds known as solid electrolytes (including those without protonic conductivity).

Figure 1B:
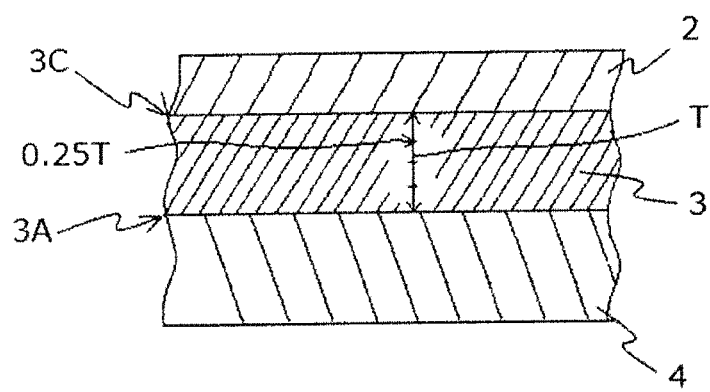
FIG. 1B is an enlarged sectional view of a solid electrolyte layer and the surrounding area in FIG. 1A.

The solid electrolyte layer contains a large amount of Zr, which has low reactivity with water, at a position 0.25 T, where T is the thickness, from the surface 3C opposite the cathode (see FIG. 1B; hereinafter also simply referred to as "near the surface 3C"). That is, the amount of Zr near the surface 3C ($Zr_C$) is larger than that of Ce ($Ce_C$), which is susceptible to moisture (the elemental ratio $Zr_C/Ce_C>1$). This improves the water resistance.

The solid electrolyte layer contains a relatively large amount of Ce at a position 0.25 T, where T is the thickness, from the surface 3A opposite the anode (hereinafter also simply referred to as "near the surface 3A"). That is, the elemental ratio near the surface 3A, $Zr_A/Ce_A$, is smaller than that near the surface 3C ($Zr_C/Ce_C>Zr_A/Ce_A$). This reduces the interfacial resistance between the solid electrolyte layer and the anode and thus improves the power. As described later, if the anode contains nickel oxide (NiO), a large amount of Ce near the surface 3A tends to reduce the influence of Ni diffused from the anode on the solid electrolyte layer.

The elemental ratio near the surface 3C, $Zr_C/Ce_C$, is preferably 2 or more ($Zr_C/Ce_C \geq 2$). An elemental ratio near the surface 3C, $Zr_C/Ce_C$, within this range further improves the water resistance. More preferably, the elemental ratio $Zr_C/Ce_C$ is 3 or more ($Zr_C/Ce_C \geq 3$).

The elemental ratio near the surface 3A, $Zr_A/Ce_A$, is preferably less than 2 ($Zr_A/Ce_A<2$). An elemental ratio near the surface 3A, $Zr_A/Ce_A$, within this range further reduces the interfacial resistance. More preferably, the elemental ratio $Zr_A/Ce_A$ is 1.7 or less ($Zr_A/Ce_A \geq 1.7$).

The elemental ratio of the interior of the solid electrolyte layer can be determined by evaluating its elemental distribution (depth profile) by energy-dispersive X-ray spectroscopy (EDX). For example, the thickness (T) of the solid electrolyte layer is defined as the distance from the interface between the cathode and the solid electrolyte layer to the interface between the solid electrolyte layer and the anode on a line drawn through a certain point in the solid electrolyte layer in a direction normal to the main surface of the solid electrolyte layer. The thickness T is divided into four equal parts, and the profile is evaluated at a position 0.25 T inward of the surface 3C and a position 0.25 T inward of the surface 3A. The same evaluation is performed at another certain point in the solid electrolyte layer. This procedure may be performed, for example, at any multiple points (e.g., five points), and the results may be averaged to determine the elemental ratio. Alternatively, the elemental ratio may be determined by evaluating the distributions of Zr and Ce in the thickness direction by a combination of X-ray photoelectron spectroscopy (XPS, also known as Electron Spectroscopy for Chemical Analysis (ESCA)) and ion etching.

The compound, having a perovskite structure, present in the solid electrolyte layer is represented, for example, by formula (1):

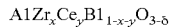

$$A1Zr_xCe_yB1_{1-x-y}O_{3-\delta} \qquad \text{Formula (1):}$$

where A1 is an alkaline earth metal element; B1 is a rare-earth element other than cerium; $0.4<x \leq 0.6$ and $0<y \leq 0.4$ are preferably satisfied; and $\delta$ is the oxygen deficiency. Formula (1) represents the average composition throughout the solid electrolyte. For reasons of water resistance, it is more preferred that the amounts of elements x and y satisfy $x>y$.

The element A1 is an alkaline earth metal element that occupies the A-sites of the perovskite structure, with specific examples including elements similar to those illustrated above. In particular, the element A1 is preferably Ba. The element B1 is a dopant that occupies some of the B-sites of the perovskite structure, with specific examples including elements similar to those illustrated above. In particular, the element B1 is preferably Y.

The average composition represented by formula (1) can be determined, for example, by EDX. Specifically, the elemental distribution (depth profile) is evaluated at multiple points (e.g., five points) at different distances from the surface 3C on a normal line drawn through a certain point, as described above. The resulting profiles may be averaged to determine the average composition.

A first region is defined as a region extending 0.5 T from the surface 3C, and a second region is defined as the region other than the first region. The elemental ratio of Zr to Ce in the first region, $Zr_{R1}/Ce_{R1}$, is preferably larger than the elemental ratio of Zr to Ce in the second region, $Zr_{R2}/Ce_{R2}$. This is because a large amount of Zr on the cathode side improves the water resistance. In addition, a relatively large proportion of Ce in the other region tends to improve the power since it reduces both the interfacial resistance and the grain boundary resistance of the solid electrolyte layer.

More preferably, the elemental ratio in a region extending 0.3 T from the surface 3C, $Zr_{0.3}/Ce_{0.3}$, and the elemental ratio in the other region, $Zr_{0.7}/Ce_{0.7}$, satisfy $Zr_{0.3}/Ce_{0.3}>Zr_{0.7}/Ce_{0.7}$. This is because a large proportion of Ce over a broader region tends to improve the power characteristics.

The elemental ratios in the first and second regions may be the average elemental ratios in those regions determined as described above. Specifically, the profile is evaluated by EDX at multiple points (e.g., three points) at different distances from the surface 3C on a normal line drawn as described above in the region (first region) extending 0.5 T from the surface 3C, and the results are averaged to determine the elemental ratio of Zr to Ce in the first region. The elemental ratio of Zr to Ce in the second region can be similarly determined.

The elemental ratio in the first region, $Zr_{R1}/Ce_{R1}$, is preferably 2 or more ($Zr_{R1}/Ce_{R1} \geq 2$). The elemental ratio in the second region, $Zr_{R2}/Ce_{R2}$, is preferably less than 2 ($Zr_{R2}/Ce_{R2}<2$). Preferably, but not necessarily, the solid electrolyte layer has a thickness of about 5 to 25 μm so that it has a lower resistance.

The elemental ratio of Zr to Ce present in the solid electrolyte layer, Zr/Ce, may change such that it decreases from the cathode side toward the anode side. This change may be either continuous or stepwise, provided that it can be recognized as a general tendency.

For example, the depth profile is evaluated by EDX at multiple points (e.g., five points) at different distances from the surface 3C on a normal line drawn through a certain point as described above, and the elemental ratio Zr/Ce at each point is calculated. The thus-calculated elemental ratios Zr/Ce are plotted in a graph of the elemental ratio Zr/Ce on the vertical axis versus the distance from the surface 3C on the horizontal axis. If a downward-sloping approximate line or curve is obtained from this graph by the least squares method, it can be determined that the elemental ratio Zr/Ce decreases from the cathode side toward the anode side as a general tendency.

The elemental ratio Zr/Ce can be considered to decrease continuously from the cathode side toward the anode side even if the elemental ratio at a point 0.2 T from the surface 3C, $Zr_{0.2}/Ce_{0.2}$, and the elemental ratio at a point 0.4 T from the surface 3C, $Zr_{0.4}/Ce_{0.4}$, are equal to each other or satisfy $Zr_{0.2}/Ce_{0.2}<Zr_{0.4}/Ce_{0.4}$, provided that the relationship between the elemental ratios at points 0.2 T, 0.5 T, and 0.7 T from the surface 3C satisfies $Zr_{0.2}/Ce_{0.2}>Zr_{0.5}/Ce_{0.5}$ and $Zr_{0.5}/Ce_{0.5}>Zr_{0.7}/Ce_{0.7}$.

The elemental ratio Zr/Ce can be considered to decrease stepwise from the cathode side toward the anode side even if the elemental ratio in the first region, which extends 0.5 T from the surface 3C, does not substantially change (e.g., the change in elemental ratio is 20% or less), and the elemental ratio in the second region, which extends over the remaining thickness, also does not substantially change (e.g., the change in elemental ratio is 20% or less), provided that the average elemental ratio in the first region, $Zr_{L1}/Ce_{L1}$, and the average elemental ratio in the second region, $Zr_{L2}/Ce_{L2}$, satisfy $Zr_{L1}/Ce_{L1} > Zr_{L2}/Ce_{L2}$.

[Cathode]

The cathode 2 can adsorb and dissociate oxygen molecules into ions and have a porous structure. At the cathode 2, protons migrating through the solid electrolyte layer 3 react with oxide ions (oxygen reduction reaction). The oxide ions are produced by the dissociation of an oxidant (oxygen) introduced through an oxidant channel, described later.

Examples of cathode materials include known materials used for cathodes in fuel cells and gas decomposition devices. Particularly preferred are compounds having a perovskite structure. Specific examples of such compounds include lanthanum strontium cobalt ferrite (LSCF, $La_{1-a}Sr_aCo_{1-b}Fe_bO_{3-\delta}$, where $0<a<1$, $0<b<1$, and $\delta$ is the oxygen deficiency), lanthanum strontium manganite (LSM, $La_{1-c}Sr_cMnO_{3-\delta}$, where $0<c<1$, and $\delta$ is the oxygen deficiency), lanthanum strontium cobaltite (LSC, $La_{1-d}Sr_dCoO_{3-\delta}$, where $0<d<1$, and $\delta$ is the oxygen deficiency), and samarium strontium cobaltite (SSC, $Sm_{1-e}Sr_eCoO_{3-\delta}$, where $0<e<1$, and $\delta$ is the oxygen deficiency).

The cathode 2 may contain a catalyst such as Ag, which catalyzes the reaction between protons and an oxidant. A cathode 2 containing a catalyst can be formed by mixing the catalyst and a material as described above and sintering the mixture. The thickness of the cathode 2 may be, but not limited to, about 10 to 30 μm.

[Anode]

The anode 4 has a porous structure. At the anode 4, a reaction occurs in which a fuel such as hydrogen introduced through a channel, described later, is oxidized to release protons and electrons (fuel oxidization reaction).

Examples of anode materials include known materials used for anodes in fuel cells. Specific examples of such materials include complex oxides of nickel oxide (NiO), serving as a catalyst component, with yttrium oxide ($Y_2O_3$), BCY, BZY, or a solid electrolyte represented by formula (1) above (hereinafter also referred to as BZCY). The use of BZCY tends to result in a lower resistance since it reduces the substantial interdiffusion of metal elements present in the anode 4 and the solid electrolyte layer 3. The use of BCY tends to result in a smaller elemental ratio Zr/Ce near the surface 3A of the solid electrolyte layer since Ce present in the anode material diffuses into the solid electrolyte layer.

An anode 4 containing such a complex oxide can be formed, for example, by mixing and sintering a NiO powder and a BZCY powder or other powder. The anode 4 may have a thickness of, for example, about 30 to 800 μm. The anode 4 may be thick enough to function as a support for the cell structure 1. FIG. 1 illustrates the anode 4 as being thicker than the cathode 2 so that the anode 4 functions as a support for the cell structure 1. The anode 4 is not limited to such a thickness, but may be, for example, thinner than the cathode 2.

As a gas containing a gaseous substance that produces hydrogen upon decomposition, such as ammonia, methane, or propane, is introduced into the anode, the decomposition reaction of the gaseous substance occurs at the anode to produce hydrogen. That is, the cell structure has gas decomposition capability and can thus be used in a gas decomposition device.

For example, hydrogen produced by the decomposition of ammonia is oxidized by the anode to produce protons. The resulting protons migrate through the solid electrolyte layer 3 into the cathode 2.

At the same time, $N_2$ produced by the decomposition of ammonia is discharged as exhaust gas from a fuel gas outlet, described later. The anode may contain a catalyst that functions to decompose the above gas. Examples of catalysts that function to decompose gases such as ammonia include compounds containing at least one catalyst component selected from the group consisting of Fe, Co, Ti, Mo, W, Mn, Ru, and Cu.

[Buffer Layer]

A buffer layer may be disposed between the cathode 2 and the solid electrolyte layer 3. The buffer layer functions to prevent separation and cracking between the cathode 2 and the solid electrolyte layer 3.

It is desirable that the buffer layer be protonically conductive and have low reactivity with the cathode 2 and the solid electrolyte layer 3. It is also desirable that the material used for the buffer layer have a thermal expansion coefficient between those of the cathode 2 and the solid electrolyte layer 3. One such material is yttrium-doped lanthanum zirconate, which has a pyrochlore structure. The thickness of the buffer layer may be, but not limited to, about 1 to 5 μm.

[Method for Manufacturing Cell Structure]

A cell structure including a solid electrolyte layer having different elemental ratios Zr/Ce on the cathode and anode sides can be fabricated, for example, as follows.

A cathode material, an anode material (both described later), and two solid electrolytes having different elemental ratios of Zr to Ce, Zr/Ce, are first provided (first step). The compound having a larger Zr/Ce is hereinafter referred to as "compound Z", whereas the compound having a smaller Zr/Ce is hereinafter referred to as "compound C".

The compound Z is represented, for example, by formula (2):

$$A2Zr_{x1}Ce_{y1}B2_{1-x1-y1}O_{3-\delta} \qquad \text{Formula (2):}$$

where $x1/y1>1$ is satisfied; the element A2 is preferably an alkaline earth metal element; the element B2 is preferably a rare-earth element other than cerium; $0.4 \leq x1 \leq 1$ and $0 \leq y1 \leq 0.5$ are preferably satisfied; and $\delta$ is the oxygen deficiency.

The compound C is represented, for example, by formula (3):

$$A3Zr_{x2}Ce_{y2}B3_{1-x2-y2}O_{3-\delta} \qquad \text{Formula (3):}$$

where $x1/y1>x2/y2$ is satisfied; the element A3 is preferably an alkaline earth metal element; the element B3 is preferably a rare-earth element other than cerium; $0 \leq x2 < 0.5$ and $0.4 \leq y2 \leq 1$ are preferably satisfied; and $\delta$ is the oxygen deficiency.

The elements A2 and A3 may be elements similar to those illustrated for the element A1. The elements B2 and B3 may be elements similar to those illustrated for the element B1. The elements A2 and A3 may be the same or different. The elements B2 and B3 may be the same or different.

After the anode material is formed into an anode shape (second step), a paste containing a powder of the compound C and a binder resin is deposited to a predetermined thickness on the surface of the formed anode material by a process such as screen printing, spray coating, spin coating, or dip coating (third step). A paste containing a powder of the compound Z and a binder resin is then similarly deposited to a predetermined thickness on the surface of the compound C. The compounds C and Z are sintered at a temperature of; for example, 1,300° C. to 1,500° C. to form a solid electrolyte layer (fourth step). Finally, the cathode material is similarly deposited on the surface of the solid electrolyte layer and is sintered in an oxygen atmosphere at, for example, 800° C. to 1,100° C. (fifth step).

It is preferred to provide a step of pre-sintering the anode material after the second step and before the third step. Pre-sintering may be performed at a temperature lower than the temperature at which the anode material is sintered (e.g., 900 to 1,100° C.). Pre-sintering facilitates the deposition of the compound C in the third step.

In the fourth step, the pastes may be initially heated at a relatively low temperature, i.e., about 600° C. to 800° C., to remove the binder resin before being heated to and sintered at 1,300° C. to 1,500° C. In the fifth step, a buffer layer material may be deposited on the surface of the solid electrolyte layer before the cathode material is deposited thereon. In this way, a buffer layer can be formed between the solid electrolyte layer and the cathode. The buffer layer material may be deposited by the same process as the solid electrolytes.

In the fourth step, the anode material and the compound C are co-sintered, and the compounds C and Z are co-sintered. The co-sintering of the compounds C and Z involves the interdiffusion of Zr and Ce. Thus, the elemental ratio of Zr to Ce in the resulting solid electrolyte layer changes such that it decreases continuously from the cathode side toward the anode side.

It is not necessary to use only two solid electrolytes; three or more solid electrolytes may be used. For example, a step of depositing a compound having an elemental ratio Zr/Ce between those of the compounds C and Z may be added between the steps of depositing the compounds C and Z.

A step of co-sintering the anode material and the compound C may also be added between the third and fourth steps to form a solid electrolyte layer whose elemental ratio of Zr to Ce decreases stepwise from the cathode side toward the anode side. This is because co-sintering the anode material and the compound C before depositing and sintering a layer containing the compound Z reduces the interdiffusion of Zr and Ce between the compounds C and Z. A very thin interfacial region where Zr and Ce are interdiffused may be present between the layers. In particular, depositing the compounds C and Z in sequence in the third step before co-sintering the compounds C and Z in the fourth step is preferred for reasons of sinterability.

In this case, it is not necessary to use only two solid electrolytes; three or more solid electrolytes may be used. For example, a step of depositing and sintering a compound having an elemental ratio Zr/Ce between those of the compounds C and Z may be added between the step of sintering the compound C and the step of depositing the compound Z. This allows the elemental ratio Zr/Ce to change in three or more steps.

For example, a solid electrolyte containing Ba in the A-sites and Y in some of the B-sites can be synthesized by the following process.

Barium carbonate, zirconium oxide, cerium oxide, and yttrium oxide powders are mixed in a predetermined proportion and are pulverized and blended in a ball mill for 24 hours. The resulting mixture is pelletized by uniaxial press forming at 20 to 50 MPa and is fired in an air atmosphere at 1,200° C. to 1,600° C. for 10 to 24 hours. The elemental ratio of Zr to Ce can be changed by changing the ratio of zirconium oxide to cerium oxide. The resulting solid electrolyte is pulverized and blended again in a ball mill for 10 to 100 hours to obtain a solid electrolyte powder.

[Fuel Cell]

Figure 2:
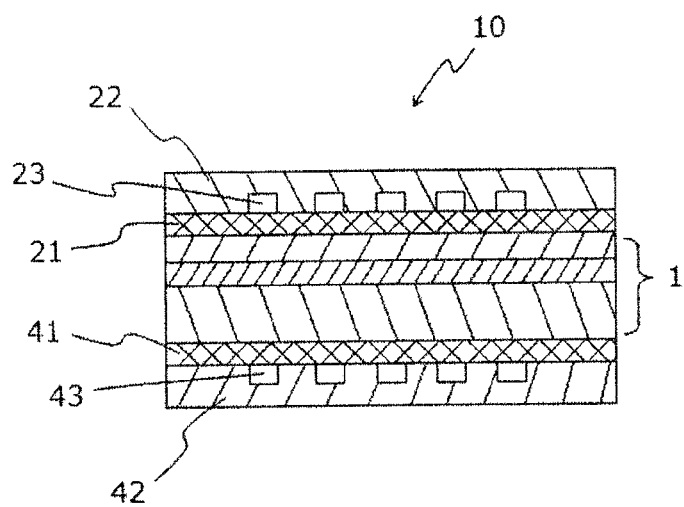
FIG. 2 is a schematic sectional view of a fuel cell according to one embodiment of the present invention.

FIG. 2 is a schematic sectional view of the construction of a fuel cell 10.

The fuel cell 10 includes the cell structure 1, an oxidant channel 23 for supplying an oxidant to the cathode, and a fuel channel 43 for supplying a fuel to the anode.

The oxidant channel 23 has an oxidant inlet into which an oxidant flows and an oxidant outlet from which substances such as water produced by the reaction and unused oxidant are discharged (both not shown). An example of an oxidant is a gas containing oxygen. The fuel channel 43 has a fuel gas inlet into which a fuel gas flows and a fuel gas outlet from which substances such as unused fuel and $N_2$ or $CO_2$ produced by the reaction are discharged (both not shown).

The fuel cell 10, which includes a protonically conductive solid electrolyte layer, can operate below 700° C., preferably in the medium-temperature range, i.e., about 400° C. to 600° C.

[Separator]

The oxidant channel 23 may be formed, for example, in a cathode separator 22 disposed outside the cathode. Similarly, the fuel channel 43 may be formed, for example, in an anode separator 42 disposed outside the anode.

If the fuel cell 10 is composed of a stack of cell structures, each unit includes, for example, the cell structure 1, the cathode separator 22, and the anode separator 42. For example, these cell structures 1 may be connected in series with separators having gas channels on both sides (oxidant channel and fuel channel).

For reasons of conductivity and heat resistance, heat-resistant alloys such as stainless steel, nickel-based alloys, and chromium-based alloys may be used as separator materials. In particular, stainless steel is preferred for its low cost. Stainless steel can be used as a separator material for PCFCs, which have operating temperatures of about 400° C. to 600° C.

[Current Collector]

The fuel cell 10 may further include current collectors. For example, the fuel cell 10 may include a cathode current collector 21 disposed between the cathode and the cathode separator 22 and an anode current collector 41 disposed between the anode and the anode separator 42. The cathode current collector 21 functions not only to collect a current, but also to supply an oxidant gas introduced from the oxidant channel 23 to the cathode while diffusing it. The anode current collector 41 functions not only to collect a current, but also to supply a fuel gas introduced from the fuel channel 43 to the anode while diffusing it. Accordingly, each current collector is preferably a gas-permeable structure.

Examples of structures that may be used as the current collectors include porous metal bodies, meshed metals, perforated metals, and expanded metals, such as those of platinum, silver, silver alloys, nickel, and nickel alloys. In particular, porous metal bodies are preferred for their light weight and gas permeability. Particularly preferred are porous metal bodies having a three-dimensional mesh-like structure. A three-dimensional mesh-like structure refers to a structure in which rods or fibers of metal that form a porous metal body are three-dimensionally linked together to form a network. Examples of such structures include sponge-like structures and nonwoven-fabric-like structures.

A porous metal body can be formed, for example, by coating a porous resin body having continuous pores with a metal as described above. After the metal coating process, the resin inside is removed to leave cavities in the porous metal skeleton, thus forming a hollow structure. An example of a commercially available porous metal body having such a structure is "Celmet" (registered trademark), which is a nickel product available from Sumitomo Electric Industries, Ltd.

The present invention is further illustrated by the following examples, although the following examples are not intended to limit the invention.

Example 1

(1) Fabrication of Cell Structure

A cell structure was fabricated by the following procedure.

BZY ($BaZr_{0.8}Y_{0.2}O_{2.9}$) and BCY ($BaCe_{0.8}Y_{0.2}O_{2.9}$) powders were mixed with NiO to prepare a mixture containing 70% by volume Ni (catalyst component). The mixture was pulverized and blended in a ball mill. The BZY and BCY powders were mixed in a volume ratio of 1:1.

The mixture was then press-formed into a circular sheet (500 μm thick) for forming the anode. The sheet was pre-sintered at 1,000° C. for 10 hours. A paste containing a BCY ($BaCe_{0.8}Y_{0.2}O_{2.9}$) powder, an organic solvent (butyl carbitol acetate), and a binder resin (ethyl cellulose) was then applied to one surface of the sheet by screen printing. A paste containing a BZY ($BaZr_{0.8}Y_{0.2}O_{2.9}$) powder and the same organic solvent and binder resin as above was further applied by screen printing and was heated at 750° C. to remove the water-soluble binder resin. The coated sheet was then sintered by heating at 1,400° C. for 10 hours to form an anode and a solid electrolyte layer (20 μm thick).

An LSCF ($La_{0.6}Sr_{0.4}Co_{0.2}Fe_{0.8}O_{3-\delta}$) powder and the same organic solvent as above were mixed together to prepare an LSCF paste as a cathode material. The LSCF paste was sprayed onto the surface of the solid electrolyte layer. The LSCF was then sintered by heat treatment at 1,000° C. for 2 hours to form a cathode (20 μm thick).

The composition of the solid electrolyte layer of the resulting cell structure was determined by EDX at point 1, which was 25% of the thickness T (0.25 T) from the surface opposite the cathode in the thickness direction, at point 2, which was 45% of the thickness T (0.45 T) from the surface opposite the cathode in the thickness direction, and at point 3, which was 75% of the thickness T (0.75 T) from the surface opposite the cathode in the thickness direction, and the elemental ratio Zr/Ce was calculated. The elemental ratio Zr/Ce was 3.5 at point 1, 3.5 at point 2, and 1.6 at point 3, indicating that the elemental ratio varied continuously. The average composition throughout the solid electrolyte layer was $BaZr_{0.5}Ce_{0.3}Y_{0.2}O_{3-\delta}$.

(2) Fabrication of Fuel Cell

Porous nickel current collectors (Celmet available from Sumitomo Electric Industries, Ltd., having a thickness of 1 mm and a porosity of 95% by volume) were placed on the surfaces of the cathode and the anode of the cell structure fabricated as described above (90 mm in diameter). A stainless steel cathode separator having an oxidant channel was placed on the cathode current collector, whereas a stainless steel anode separator having a fuel channel was placed on the anode current collector. Fuel Cell A shown in FIG. 2 was thus fabricated. Each current collector was connected to one end of a lead. The other end of the lead was routed outside the fuel cell and was connected to a measuring instrument for measuring the current and voltage between the leads.

(Evaluation 1) Power Density

Figure 3:
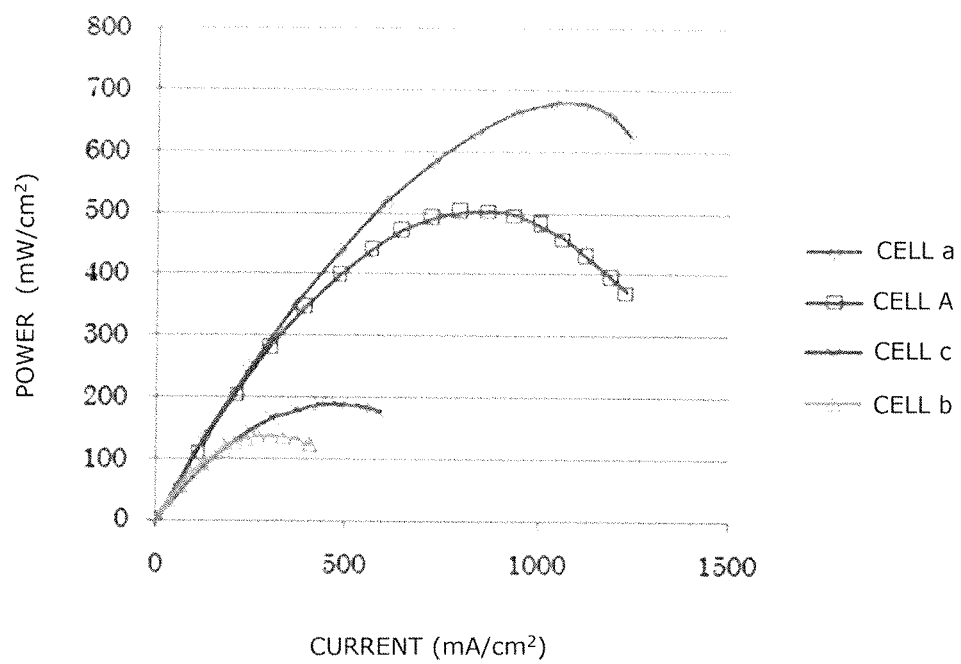
FIG. 3 is a graph showing the power density of fuel cells according to an example and comparative examples.

The resulting fuel cell was tested for initial power density at an operating temperature of 600° C. by supplying hydrogen as a fuel gas to the anode at 100 $cm^3$/min and supplying air to the cathode at 200 $cm^3$/min. The results are shown in FIG. 3.

(Evaluation 2) Voltage Change

Figure 4:
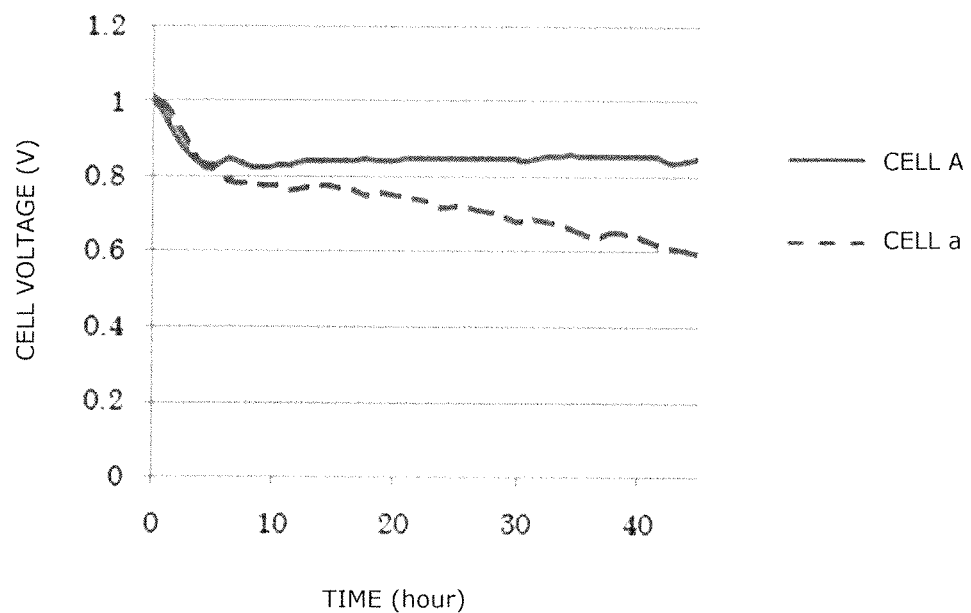
FIG. 4 is a graph showing the change in voltage of fuel cells according to an example and a comparative example.

The fuel cell was tested for voltage change during power generation at constant current (120 mA/$cm^2$) under the same conditions as in (1). The results are shown in FIG. 4.

Comparative Example 1

Fuel Cell a was fabricated as in Example 1 except that a BCY ($BaCe_{0.8}Y_{0.2}O_{2.9}$) power was used alone as a solid electrolyte and was tested according to Evaluations 1 and 2.

Comparative Example 2

Fuel Cell b was fabricated as in Example 1 except that a BZY ($BaZr_{0.8}Y_{0.2}O_{2.9}$) power was used alone as a solid electrolyte and was tested according to Evaluation 1.

Comparative Example 3

Fuel Cell c was fabricated as in Example 1 except that a BZCY ($BaZr_{0.6}Ce_{0.2}Y_{0.2}O_{2.9}$) power was used alone as a solid electrolyte and was tested according to Evaluation 1. The elemental ratio Zr/Ce was 3.0 at all of points 1 to 3, indicating that the elemental ratio did not vary on the anode and cathode sides.

Cell A, in which the elemental ratio Zr/Ce of the solid electrolyte layer varied on the cathode and anode sides, exhibited a significantly higher power than Cell b, in which BZY was used alone as a solid electrolyte, and Cell c, in which BZCY was used as a solid electrolyte. Although Cell a, in which BCY was used as a solid electrolyte, initially exhibited high power, the voltage decreased over time, indicating low durability. In contrast, Cell A had high durability without a decrease in voltage over time.

INDUSTRIAL APPLICABILITY

A cell structure according to the present invention has high power density and durability and can thus be applied to various solid oxide fuel cells.

REFERENCE SIGNS LIST 1 cell structure
2 cathode
3 solid electrolyte layer
4 anode
10 fuel cell
21, 41 current collector
22, 42 separator
23 oxidant channel
43 fuel channel

The invention claimed is:
1. A cell structure comprising:
a cathode;
an anode; and
a protonically conductive solid electrolyte layer between the cathode and the anode, wherein
the solid electrolyte layer comprises a compound having a perovskite structure and containing zirconium, cerium, and a rare-earth element other than cerium, and if the solid electrolyte layer has a thickness of T, the elemental ratio of zirconium to cerium at a position 0.25 T from a surface of the solid electrolyte layer opposite the cathode, $Zr_C/Ce_C$, and the elemental ratio of zirconium to cerium at a position 0.25 T from a surface of the solid electrolyte layer opposite the anode, $Zr_A/Ce_A$, satisfy $Zr_C/Ce_C > Zr_A/Ce_A$, and $Zr_C/Ce_C > 1$.

2. The cell structure according to claim 1, wherein the elemental ratio $Zr_C/Ce_C \geq 2$, and the elemental ratio $Zr_A/Ce_A < 2$.

3. The cell structure according to claim 1, wherein the compound is represented by formula (1):

$$A1Zr_xCe_yB1_{1-x-y}O_{3-\delta}$$

(where A1 is an alkaline earth metal element; B1 is a rare-earth element other than cerium; $0.4 < x \leq 0.6$; $0 < y \leq 0.4$; and $\delta$ is an oxygen deficiency).

4. A fuel cell comprising the cell structure according to claim 1, wherein the fuel cell has an oxidant channel for supplying an oxidant to the cathode and a fuel channel for supplying a fuel to the anode.

5. A method for manufacturing a cell structure, comprising:

a first step of providing a cathode material, an anode material, and solid electrolytes, the solid electrolytes including a compound Z represented by formula (2):

$$A2Zr_{x1}Ce_{y1}B2_{1-x1-y1}O_{3-\delta}$$

(where A2 is an alkaline earth metal element; B2 is a rare-earth element other than cerium; $x1/y1 > 1$; $0.4 \leq x1 \leq 1$; $0 \leq y1 \leq 0.5$; and $\delta$ is an oxygen deficiency) and a compound C represented by formula (3):

$$A3Zr_{x2}Ce_{y2}B3_{1-x2-y2}O_{3-\delta}$$

(where A3 is an alkaline earth metal element; B3 is a rare-earth element other than cerium; $x1/y1 > x2/y2$; $0 \leq x2 < 0.5$; $0.4 \leq y2 \leq 1$; and $\delta$ is an oxygen deficiency);

a second step of forming the anode material into an anode shape;

a third step of depositing the compound C on a surface of the formed anode material;

a fourth step of depositing the compound Z on a surface of the deposited compound C and sintering the compounds C and Z to form a solid electrolyte layer; and a fifth step of depositing the cathode material on a surface of the solid electrolyte layer and sintering the cathode material.

* * * * *